US012791465B2

(12) United States Patent
Miyamoto et al.

(10) Patent No.: US 12,791,465 B2
(45) Date of Patent: Nov. 10, 2026

(54) WEATHER RESISTANCE TESTING APPARATUS AND WEATHER RESISTANCE TESTING METHOD

(71) Applicant: TOPPAN INC., Tokyo (JP)

(72) Inventors: Shinichi Miyamoto, Tokyo (JP); Kae Tochigi, Tokyo (JP); Megumi Kashiwame, Tokyo (JP); Kenji Nose, Tokyo (JP)

(73) Assignee: TOPPAN INC., Tokyo (JP)

( * ) Notice: Subject to any disclaimer, the term of this patent is extended or adjusted under 35 U.S.C. 154(b) by 288 days.

(21) Appl. No.: 18/388,147

(22) Filed: Nov. 8, 2023

(65) Prior Publication Data

US 2024/0068929 A1 Feb. 29, 2024

Related U.S. Application Data

(63) Continuation of application No. PCT/JP2022/020260, filed on May 13, 2022.

(30) Foreign Application Priority Data

May 17, 2021 (JP) ................................ 2021-083023
Feb. 10, 2022 (JP) ................................ 2022-019437

(51) Int. Cl.
*G01N 17/00* (2006.01)

(52) U.S. Cl.
CPC ......... *G01N 17/002* (2013.01); *G01N 17/004* (2013.01)

(58) Field of Classification Search
None
See application file for complete search history.

(56) References Cited

U.S. PATENT DOCUMENTS 2,917,927 A * 12/1959 Clark ........................ G01N 3/32 73/35.17
4,817,447 A * 4/1989 Kashima .............. G01N 17/004 374/57
4,995,273 A * 2/1991 Kisima ................ G01N 17/004 374/57
5,381,701 A * 1/1995 Frankenthal ....... G01R 31/2817 73/865.6

(Continued)

FOREIGN PATENT DOCUMENTS

CN 107300938 A * 10/2017 ............. G05D 27/02
CN 110501279 A 11/2019

(Continued)

OTHER PUBLICATIONS

Machine translation of CN 110501279A published Nov. 16, 2019.*

(Continued)

*Primary Examiner* — Daniel S Larkin
(74) *Attorney, Agent, or Firm* — Foley & Lardner LLP

(57) ABSTRACT

The weather resistance testing apparatus includes a pressurizable container, a sample holder, and a light irradiation device having a light source. The pressurizable container has a quartz glass plate that can transmit light. The sample holder is disposed in the pressurizable container and can hold a sample. In this weather resistance testing apparatus, the light irradiation device is disposed outside the pressurizable container and irradiates the sample with light from the light source via the quartz glass plate.

11 Claims, 9 Drawing Sheets

(56) References Cited

U.S. PATENT DOCUMENTS

| | | | | | |
|---|---|---|---|---|---|
| 5,476,636 | A | * | 12/1995 | Tomiita | G01N 17/00 422/53 |
| 2011/0061477 | A1 | | 3/2011 | Fitz | |
| 2013/0193219 | A1 | | 8/2013 | Xia et al. | |

FOREIGN PATENT DOCUMENTS

| | | | | | |
|---|---|---|---|---|---|
| CN | 110542643 | A | | 12/2019 | |
| JP | S55-164540 | U | | 11/1980 | |
| JP | 57014740 | A | * | 1/1982 | G01N 17/00 |
| JP | S60-066104 | A | | 4/1985 | |
| JP | H01-21891 | B2 | | 4/1989 | |
| JP | H01-28897 | B2 | | 6/1989 | |
| JP | H04-340441 | A | | 11/1992 | |
| JP | H04-353744 | A | | 12/1992 | |
| JP | H07-020036 | A | | 1/1995 | |
| JP | H07-092431 | B2 | | 4/1995 | |
| JP | 2008-216001 | A | | 9/2008 | |

OTHER PUBLICATIONS

European Partial Supplementary Search Report issued in corresponding European Patent Application No. 22804614.0 dated Sep. 23, 2024 (13 pages).

European Extended Search Report issued in corresponding European Patent Application No. 22804614.0 dated Jan. 16, 2025.

International Searching Authority, "International Search Report," issued in connection with International Patent Application No. PCT/JP2022/020260, dated Jul. 5, 2022.

International Searching Authority, "Written Opinion," issued in connection with International Patent Application No. PCT/JP2022/020260, dated Jul. 5, 2022.

Contract testing/consulting, "Pressure Cooker Tests", ESPEC, retrieved from: https://www.espec.co.jp/products/trustee/test/pressurecooker.html.

Office Action issued in corresponding Japanese Patent Application No. 2022-019437 dated Nov. 1, 2022 (6 pages).

Office Action issued in corresponding Japanese Patent Application No. 2022-203519 dated Feb. 10, 2026.

* cited by examiner

FIG.9

| | TYPE OF APPARATUS | LIGHT SOURCE | LIGHT INTENSITY (mW/cm$^2$) | GAS | | OXYGEN PARTIAL PRESSURE | PRESSURE (Mpa) | TEMPERATURE (°C) | WATER SPRAYING | HUMIDITY (%) | TIME TO DETERIORATION (hr) | DETERIORATION | | EVALUATION |
|---|---|---|---|---|---|---|---|---|---|---|---|---|---|---|
| | | | | OXYGEN | NITROGEN | | | | | | | SURFACE CRACKING | INTERNAL PEELING | |
| COMP. EX. 2 | MW | METAL HALIDE | 60 | AIR | | *** | 0 | 53 | YES | 50 | 600 | YES (WHITISH) | NO | × |
| COMP. EX. 3-1 | Xe | XENON | 6 | AIR | | *** | 0 | 63 | YES | 50 | 3000 | YES (WHITISH) | YES | × |
| COMP. EX. 3-1 | Xe | XENON | 6 | AIR | | *** | 0 | 63 | NO | AIR | 4000 | YES (WHITISH) | NO | × |
| COMP. EX. 4 | S-Xe | XENON | 18 | AIR | | *** | 0 | 63 | YES | 50 | 2000 | YES (WHITISH) | NO | × |
| COMP. EX. 5 | REAL EXPOSURE | SUN | *** | AIR | | *** | 0 | AIR TEMPERATURE | REAL EXPOSURE | REAL EXPOSURE | 8 YR | YES | YES | *** |
| EX. 2 | WEATHER RESISTANCE TESTING APPARATUS 1A | XENON | 60 | 100 | 0 | *** | 0.5 | 80 | YES | 50 | 70 | YES | YES | ○ |
| EX. 3 | | XENON | 60 | 20 | 80 | 100 | 0.5 | 80 | YES | 50 | 67 | YES | YES | ○ |
| EX. 4 | | XENON | 60 | 100 | 0 | *** | 0.3 | 80 | YES | 50 | 80 | YES | YES | ○ |
| EX. 5 | | XENON | 30 | 100 | 0 | *** | 0.5 | 80 | YES | 50 | 200 | YES | YES | ○ |
| EX. 6 | | XENON | 30 | 100 | 0 | *** | 0.2 | 80 | YES | 50 | 200 | YES | YES | ○ |
| EX. 7 | | XENON | 10 | 100 | 0 | *** | 0.5 | 80 | YES | 50 | 600 | YES | YES | ○ |

WEATHER RESISTANCE TESTING APPARATUS AND WEATHER RESISTANCE TESTING METHOD

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/020260, filed on May 13, 2022, which is based upon and claims the benefit of priority to Japanese Patent Application No. 2021-083023, filed on May 17, 2021; and Japanese Patent Application No. 2022-019437, filed on Feb. 10, 2022; the disclosures of which are incorporated herein by reference in their entirety.

TECHNICAL FIELD

The present invention relates to a weather resistance testing apparatus and a weather resistance testing method.

BACKGROUND

In performing weather resistance testing to determine how quickly organic materials and inorganic materials are deteriorated by light and heat from the sun and the like, moisture from rain and the like, atmospheric oxygen, and other factors, it is optimal to perform testing under a real environment. However, with testing under a real environment it may take a long time to obtain the test results. Therefore, weather resistance testing is being conducted using an accelerated weather resistance testing apparatus that includes a light source having a higher light intensity than the sunlight to rapidly acquire the test results of the weather resistance of various materials. Known examples of such a weather resistance testing apparatus include a Sunshine Weather-Ometer (SWOM), a Metal Weather meter (MW), a Super UV (SUV), and a xenon weather meter (see, for example, PTLs 1 and 2).

The Sunshine Weather-Ometer is an apparatus that includes a carbon arc light source, irradiates a sample with light emitted from this light source and containing wavelengths from the ultraviolet to the visible region, and uses a water sprayer to spray water to the sample for a certain time, thereby performing weather resistance testing in a short period of time. This apparatus can shorten the test period to some extent. The Metal Weather meter and the Super UV each include a metal halide lamp which is a more powerful light source than the SWOM, emit irradiation light having a high intensity from the ultraviolet portion to the visible light portion from this light source to a sample, and spray water to the sample for a certain time using a water sprayer. With these apparatuses in which a light source having a high light intensity is used, weather resistance testing can be performed for a shorter period than with the Sunshine Weather-Ometer.

CITATION LIST

Patent Literatures

PTL 1: JP HO1-21891 B2;

PTL 2: JP H01-28897 B2.

SUMMARY OF THE INVENTION

Technical Problem

In the weather resistance testing apparatuses according to PTL1 and PTL 2, not only is a high-intensity light source used, but also gas pressure (for example, oxygen partial pressure) or the like in an apparatus container in which a sample is disposed is set to be higher than atmospheric pressure, in order to accelerate weather resistance testing. In this case, if a protective device that protects the light source lamp disposed in the testing apparatus is damaged by a high pressure environment or the like, this may cause water from a water sprayer to adhere to the light source lamp, leading to the occurrence of a short circuit, or may cause water adhering to the high temperature portion of the light source lamp to evaporate, leading to a rapid increase in gas pressure in the container. Although such a point can be prevented to some extent by improving the pressure resistance of the container or enhancing the damage resistance of the protective device, there is desire to develop a weather resistance testing apparatus which has improved safety while accelerating weather resistance testing.

The present invention has been made for solving the above-described problems and aims to provide a weather resistance testing apparatus and a weather resistance testing method which can improve safety while accelerating weather resistance testing.

Solution to Problem

An aspect of the present invention relates to a weather resistance testing apparatus including a pressurizable container, a sample holder, and a light irradiation device having a light source. The pressurizable container has a light-transmitting member capable of transmitting light. The sample holder is disposed in the pressurizable container and is capable of holding a sample. In this weather resistance testing apparatus, the light irradiation device is disposed outside the pressurizable container and irradiates the sample with light from the light source via the light-transmitting member.

This weather resistance testing apparatus is configured such that the light irradiation device having a light source is disposed outside the pressurizable container and irradiates the sample in the pressurizable container with light from outside the pressurizable container. In this case, since the light irradiation device is located outside the pressurizable container, the light irradiation device will never be damaged by a high pressure atmosphere or the like. Further, even if the light irradiation device is damaged for some reason, the pressure in the pressurizable container will not be rapidly increased, which reduces the effect on the pressurizable container. Thus, according to this weather resistance testing apparatus, the use of the pressurizable container can improve safety while accelerating weather resistance testing. In addition, since the light irradiation device is disposed outside the pressurizable container according to this weather resistance testing apparatus, there is no need to unnecessarily increase the size of the pressurizable container which requires a higher safety standard, and an apparatus including a smaller pressurizable container can be achieved. Safety can be improved in this respect also. Furthermore, the disposition of the light irradiation device outside the pressurizable container facilitates optical design in the light irradiation device, such as increasing the intensity of irradiation light, facilitating selection of the wavelength of irradiation light, or reducing illuminance unevenness of irradiation light to a sample. Therefore, testing can be performed under an environment closer to that of a real environment (especially in optical terms) or can be accelerated while maintaining a state close to that of a real environment. Thus, weather resistance testing can be accelerated while reproducing test results as under a real environment.

In the above-described weather resistance testing apparatus, the light irradiation device preferably has an optical system that converts the light from the light source into parallel light. In this case, light irradiated to a sample becomes more uniform, and irradiation of light having higher intensity at some parts of the sample than at other parts can be prevented. Thus, weather resistance testing can be stably performed. In addition, when a plurality of samples are simultaneously tested, there is no illuminance unevenness of irradiation light to the samples because the irradiation light is parallel light. This eliminates the need for work, such as changing positions of the samples for removing illuminance unevenness during weather resistance testing (for example, for three months to six months). Accordingly, more accurate weather resistance test results can be obtained with less work. In this case, the optical system may contain at least one collimating lens. In this weather resistance testing apparatus, the light irradiation device is disposed outside the pressurizable container as described above, and there is not much restriction on the size of the optical system for generating parallel light. Therefore, a more optimum optical system can be used.

In the above-described weather resistance testing apparatus, the light source is preferably a xenon lamp having a light intensity of 15 $mW/cm^2$ or more and 60 $mW/cm^2$ or less. In this case, a sample can be irradiated with high intensity light, and thus weather resistance testing can be easily accelerated. Also, since the waveform of the wavelength of irradiation light from a xenon (Xe) lamp is close to the waveform of sunlight, results of testing close to testing under a real environment can be easily obtained. That is, the use of the above-described light source makes it possible to rapidly obtain test results which reproduce results of weather resistance testing as under a real environment. The "light intensity ($mW/cm^2$)" used herein means the light intensity (illuminance) at a wavelength of 365 nm of irradiation light from the light source and a value measured by a method such as an accumulated UV meter (UIT-250 manufactured by Ushio Inc., with a photodetector UVD-S365).

In the weather resistance testing apparatus, light from the light source preferably contains at least ultraviolet radiation. In this case, the irradiation light contains ultraviolet radiation which is contained in sunlight and which easily affects deterioration of materials or the like, and test results which reproduce results of testing as under a real environment can be easily obtained.

In the weather resistance testing apparatus, the light irradiation device may further include an optical filter that removes at least one of ultraviolet radiation having a wavelength of 290 nm or less and infrared radiation from light from the light source. Since ultraviolet radiation having a wavelength of 290 nm or less is present only in extremely small amounts in ultraviolet radiation contained in sunlight, the use of the optical filter to remove ultraviolet radiation having wavelengths of 290 nm or less makes it possible to easily obtain test results which reproduce results of testing as under a real environment. Also, when the light irradiated to a sample contains infrared radiation, the sample becomes heated by infrared radiation. However, for example, when an easily controllable separate temperature-adjustment unit is provided, the use of the optical filter to remove infrared radiation allows for a test in which the effect of infrared radiation is reduced, and weather resistance testing can be performed under more desirable test conditions.

The weather resistance testing apparatus may further include a gas-introduction unit that introduces a gas containing oxygen gas into the pressurizable container; a pressure-adjustment unit that adjusts a gas pressure in the pressurizable container; a humidification unit that humidifies the gas containing the oxygen gas; a spray unit that sprays liquid to the sample in the pressurizable container; a temperature-adjustment unit that adjusts the temperature of the sample; a detection unit that detects at least one of the introduced amount of the gas containing the oxygen gas, the gas pressure, the humidity of the gas containing the oxygen gas, and the temperature of the sample; and a control unit that controls at least one of the gas-introduction unit, the pressure-adjustment unit, the humidification unit, the spray unit, and the temperature-adjustment unit based on a value detected by the detection unit. In this case, weather resistance testing to evaluate the deterioration of a sample caused by heat, water (rain), and oxygen can be more specifically performed, and the weather resistance testing can be accelerated by pressurization. That is, according to the above-described configuration, deterioration of a sample caused by oxygen can be promoted, deterioration due to light irradiation and deterioration due to oxygen, water (rain), temperature, and other factors can proceed in a balanced manner, and test results similar to results of weather resistance testing performed under a real environment over a long time can be reproduced in a shorter time.

In the weather resistance testing apparatus, the control unit may control the gas-introduction unit such that the concentration of the oxygen gas introduced through the gas-introduction unit relative to an entirety of the gas containing the oxygen gas is 20% or more. In this case, results of weather resistance testing under an environment closer to a real environment can be obtained.

In the weather resistance testing apparatus, the control unit may control at least one of the gas-introduction unit and the pressure-adjustment unit such that the oxygen partial pressure of the oxygen gas introduced through the gas-introduction unit is 0.2 MPa or more and 0.9 MPa or less. In this case, the deterioration due to oxygen can be further promoted to further accelerate weather resistance testing under an environment close to a real environment. The "oxygen partial pressure" used herein is the value of the oxygen partial pressure in the apparatus when the atmospheric pressure is 0 MPa.

The weather resistance testing apparatus may further include a gas-introduction unit that introduces a gas into the pressurizable container, a pressure-adjustment unit that adjusts a gas pressure in the pressurizable container, a liquid supply unit that supplies liquid into the pressurizable container, a discharged liquid-storing unit configured to be connected to the pressurizable container, an openable and closable inlet valve disposed between the pressurizable container and the discharged liquid-storing unit, and an openable and closable discharge valve configured to discharge the liquid in the discharged liquid-storing unit. According to this configuration, the adjustment of the open and close operation of the inlet valve and the discharge valve allows for externally discharging unnecessary liquid of the liquid supplied into the pressurizable container while suppressing pressure change in the pressurizable container, when weather resistance testing is performed with the inside of the pressurizable container pressurized. In this aspect, the total volume of the discharged liquid-storing unit is preferably less than or equal to the volume of the pressurizable container. In this case, pressure change in the pressurizable container during the discharge of liquid can be more reliably suppressed.

The weather resistance testing apparatus may further include a gas-introduction unit that introduces a gas into the pressurizable container, a pressure-adjustment unit that adjusts a gas pressure in the pressurizable container, and a pressure release valve that releases a pressure in the pressurizable container. This pressure release valve releases the pressure in the pressurizable container when the gas pressure in the pressurizable container exceeds the gas pressure adjustable by the pressure-adjustment unit. Also, the maximum flow rate of the gas released from the pressure release valve may be greater than the maximum flow rate of the gas flowing from the pressure-adjustment unit. According to this configuration, damage to the pressurizable container, failure of the measurement apparatus, or the like can be prevented by opening the pressure release valve, even if excess pressure is applied on the pressurizable container for some reason. This can further improve safety. Also, in this aspect, the weather resistance testing apparatus may further include a sealing valve that rapidly releases the pressure in the pressurizable container. The sealing valve releases the pressure in the pressurizable container when a value of the gas pressure in the pressurizable container is higher than the release pressure value of the pressure release valve. According to this configuration, pressure release is provided in two stages, which can more reliably prevent damage to the pressurizable container, failure of the measurement apparatus, or the like.

Another aspect of the present invention relates to a weather resistance testing method. This weather resistance testing method is a testing method of evaluating the weather resistance of the sample using a weather resistance testing apparatus having any of the above-described configurations. This weather resistance testing method includes a step of having a sample held on a sample holder and a step of irradiating the sample with light from the light irradiation device. According to such a weather resistance testing method, safety can be improved while accelerating weather resistance testing by using the pressurizable container as described above. Also, this weather resistance testing method facilitates optical design, such as increasing the intensity of irradiation light, facilitating selection of the wavelength of irradiation light, or reducing illuminance unevenness of irradiation light to a sample. Therefore, weather resistance testing can be accelerated while reproducing test results as under a real environment by performing testing closer to that under a real environment (especially in optical terms) or promoting a state closer to that of a real environment.

In the weather resistance testing method, the irradiation light to the sample is preferably parallel light that contains ultraviolet light. In this case, as described above, irradiation light to a sample becomes more uniform, and weather resistance testing can be stably performed. In addition, when a plurality of samples are simultaneously tested, there is no illuminance unevenness of irradiation light to the samples. This eliminates the need for work such as changing positions of the samples for removing illuminance unevenness during weather resistance testing. Accordingly, more accurate weather resistance test results can be obtained with less work. Furthermore, in this testing method, irradiation light contains ultraviolet light, and thus test results which reproduce results of testing as under a real environment can be easily obtained.

Advantageous Effects of the Invention

The present invention can provide a weather resistance testing apparatus and a weather resistance testing method which can improve safety while accelerating weather resistance testing.

BRIEF DESCRIPTION OF THE DRAWINGS

FIG. 9 is a table illustrating test results of Example 2 and others and Comparative Example 2 and others.

DETAILED DESCRIPTION

Figure 1:
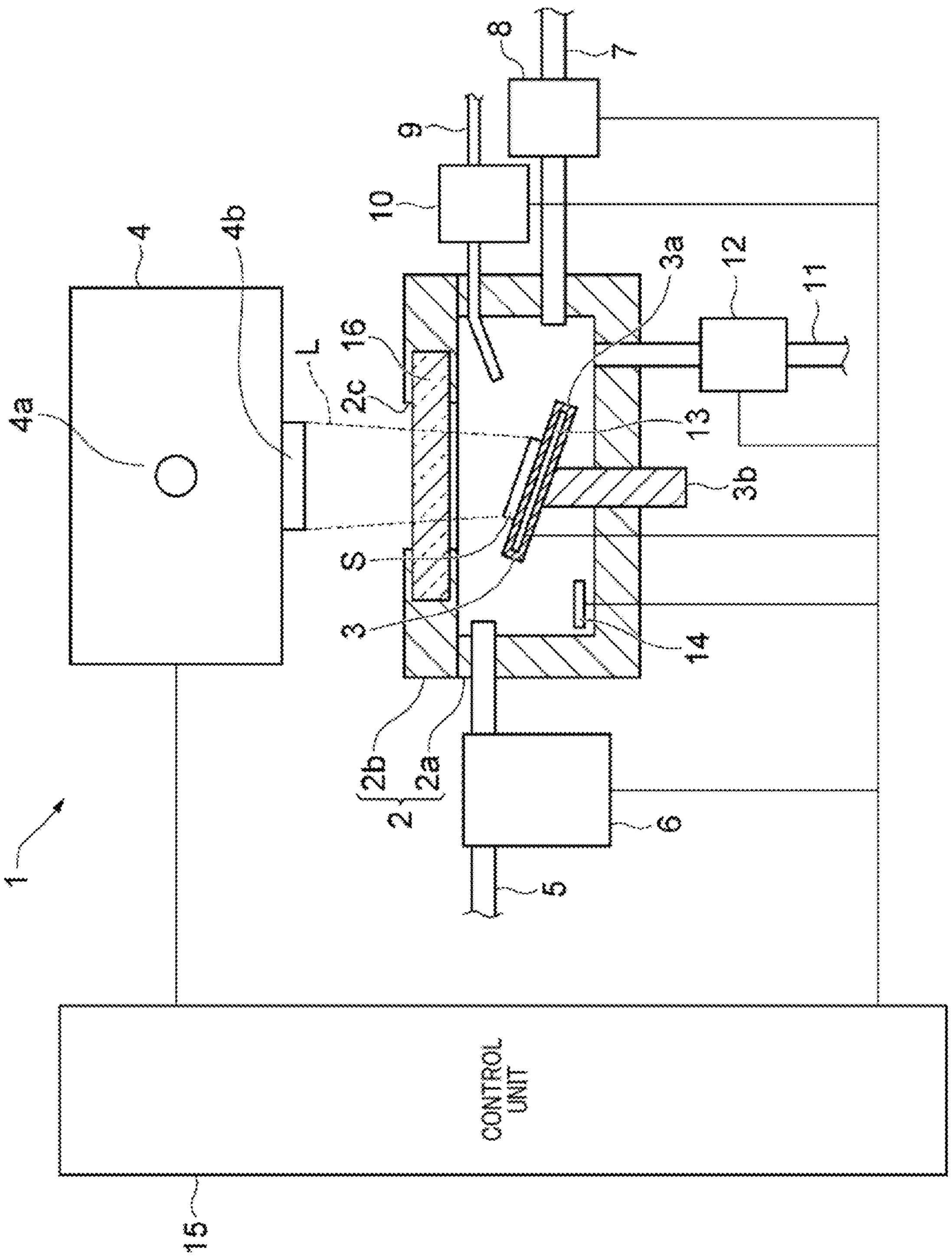
FIG. 1 is a cross-sectional view schematically illustrating a configuration of a weather resistance testing apparatus according to a first embodiment of the present invention.

Preferred embodiments of the present disclosure relating to weather resistance apparatuses and weather resistance testing methods will be described in detail below with reference to the drawings, as appropriate. In the drawings, identical or equivalent parts are marked with the same symbol, and redundant explanations are omitted. The dimensional proportions in the drawings are not limited to those shown in the drawings.

First Embodiment

FIG. 1 is a cross-sectional view schematically illustrating a configuration of a weather resistance testing apparatus according to a first embodiment of the present invention. As illustrated in FIG. 1, a weather resistance testing apparatus 1 includes a pressurizable container 2, a sample holder 3, a light irradiation device 4, a gas-introduction pipe 5 (gas-introduction unit), a humidifier 6 (humidification unit), a gas discharge pipe 7, a pressure adjuster 8 (pressure-adjustment unit), a water spray pipe 9 (spray unit, liquid supply unit), a water flow rate adjuster 10, a water discharge pipe 11, a water discharge valve 12, a temperature adjuster 13 (temperature-adjustment unit), a detection unit 14, and a control unit 15. In the weather resistance testing apparatus 1, a sample S is held on the sample holder 3 in the pressurizable container 2, and the inside of the pressurizable container 2 is adjusted to a prescribed internal pressure by the pressure adjuster 8 while introducing gas, such as oxygen or nitrogen, through the gas-introduction pipe 5. In the pressurized state, the sample S is sprayed with water from the tip of the water spray pipe 9 while being irradiated with light L from the light irradiation device 4 which simulates sunlight or the like, and further the sample S is heated by the temperature adjuster 13. The temperature adjuster 13 may cool the sample S as necessary. Gas, such as oxygen, introduced through the gas-introduction pipe 5 may be humidified by the humidifier 6. The sample S is placed in such an environment for a prescribed period to be subjected to weather resistance testing to determine how long it will take for the sample S to be deteriorated by light and heat from the sun or the like, moisture from rain or the like, atmospheric oxygen, and other factors. It is noted that the weather resistance testing apparatus 1 may be configured to further include a housing in which the above-described constituents are disposed to prevent ultraviolet radiation or high intensity light from leaking externally from the light irradiation device 4.

The pressurizable container 2 is a closed container capable of being pressurized and has a housing member 2*a* that houses the sample holder 3 and the like and a lid 2*b* that closes the opening of the housing member 2*a*. The pressurizable container 2 is configured such that, for example, the lid 2*b* at the top is removable and is removed from the housing member 2*a* when placing the sample S. After placing the sample S, the lid 2*b* is attached to the housing member 2*a* such that the inside becomes airtight. For example, their respective circumferential parts are fixed by bolts or the like. As a material of the pressurizable container 2, various materials may be used as long as they have pressure resistance to the pressure in the container. Examples thereof include SUS, aluminum alloy, iron, titanium alloy, and tungsten alloy.

The housing member 2*a* is connected with the gas-introduction pipe 5, the gas discharge pipe 7, the water spray pipe 9, and the water discharge pipe 11, and the tip of each pipe is positioned inside the housing member 2*a*. Accordingly, prescribed test gas (such as oxygen) can be introduced through the gas-introduction pipe 5 into the pressurizable container 2, and unnecessary gas can be discharged through the gas discharge pipe 7. Also, water can be sprayed to the sample S from the water spray pipe 9, and unnecessary water can be discharged through the water discharge pipe 11. Since the lid 2*b* is configured to be removed in the example of the apparatus illustrated in FIG. 1, various pipes are connected to the housing member 2*a*. However, some of these pipes may be connected to the lid 2*b*.

In a region that is in the center of the lid 2*b* and faces the sample holder 3 (sample S), an opening 2*c* is disposed. Into this opening 2*c*, a quartz glass plate 16 (light-transmitting member) is inserted in an airtight manner. The quartz glass plate 16 is positioned to face the sample holder 3 and configured to transmit light L irradiated from the light irradiation device 4 without attenuation so that the sample S is irradiated with the light L as it is. The quartz glass plate 16 may be a light-transmitting member composed of another material as long as it can transmit light L (particularly ultraviolet radiation) irradiated from the light irradiation device 4. Note that the quartz glass plate 16 constitutes a part of the pressurizable container 2 and thus has a structure which is able to maintain the atmosphere and pressure in the pressurizable container 2.

The sample holder 3 is a member that holds a sample S used in weather resistance testing. The sample holder 3 is constituted by, for example, a plate-like member 3*a* and a support member 3*b* that supports the plate-like member 3*a*, and a sample S is disposed on the plate-like member 3*a* and held by being taped thereto with an aluminum tape or the like. The plate-like member 3*a* of the sample holder 3 may be attached to the support member 3*b* in the horizontal direction but may be tilted relative to the horizontal direction such that water sprayed from the water spray pipe 9 is not retained on the sample S. Also, the sample holder 3 may contain a temperature adjuster 13 therein. The temperature adjuster 13 can be constituted by providing a heater and a cooling channel therein and feedbacks the value of a thermocouple to heat or cool the sample S and adjust the temperature of the sample S. Weather resistance testing can be performed while the temperature adjuster 13 heats and cools the sample S held by the sample holder 3 to a prescribed temperature. The heating temperature in heating the sample S by the temperature adjuster 13 is preferably not lower than room temperature and not higher than the decomposition temperature of the sample S. When the sample S is heated at a temperature not higher than decomposition temperature, deterioration by heat will not be promoted earlier than deterioration by other factors and can be balanced against deterioration by light, oxygen, humidity, and other factors. Note that instead of or in combination with the temperature adjuster 13, a gas temperature-adjustment mechanism that heats or cools gas introduced through the gas-introduction pipe 5 may be provided, or a temperature adjuster may be disposed to the pressurizable container 2 to adjust the temperature of the container itself. Also, a combination thereof may be used.

The light irradiation device 4 is constituted by having a light source 4*a* that emits light L and an optical filter 4*b* that removes light having a certain wavelength from light from the light source 4*a*. The light source 4*a* is not particularly limited as long as it emits light L that contains at least ultraviolet light, and examples thereof include a carbon arc lamp, a high-pressure mercury lamp, a xenon lamp, and a metal halide lamp which are used in weather resistance testing. These light sources can be used individually or in a combination of two different types. The light source 4*a* may be an LED light source or a laser light source. However, as the light source 4*a*, a xenon lamp, having a wavelength closest to that of sunlight, is preferably used. Also, irradiation light from the light source 4*a* preferably contains light in a wavelength range of 290 nm to 390 nm, or preferably contains light in a wavelength range which includes a part of the wavelength range of 290 nm to 390 nm. The spectral shape of the irradiation light from the light source 4*a* is preferably close to the spectral shape of sunlight, and light having a wavelength shorter than 290 nm may be contained but is preferably cut by the optical filter 4*b*. In the light L emitted from the light source, light having a wavelength longer than 390 nm does not directly cause deterioration of a sample S, but especially light having a wavelength in the infrared region has the function of, for example, heating a sample S, and thus may be retained. On the other hand, since the temperature of a sample S is adjusted by the above-described temperature adjuster 13 or the like, infrared light having a wavelength longer than 390 nm may be cut by the optical filter 4*b* in order to eliminate the effect of heating by light L.

The light irradiation device 4 is preferably configured such that a sample S is irradiated with light L from the light source 4*a* as parallel light but is not limited thereto. For example, light L from the light source 4*a* may be radially spread to some extent. In this case, it is preferable to consider, for example, the disposition of a sample S, such that the illuminance of light L from the light irradiation device 4 becomes uniform on a sample S (such that when a plurality of samples S are tested, the illuminances of the samples S are the same). The intensity of light L irradiated from the light irradiation device 4 is not particularly limited as long as it is greater than that of sunlight. For example, the light intensity at a wavelength of 365 nm of irradiation light from the light source 4*a* is preferably 15 mW/cm$^2$ or more and 60 mW/cm$^2$ or less. The "light intensity" described herein is a value measured by a device for measuring the light intensity at a wavelength of 365 nm (for example, UIT-250 manufactured by Ushio Inc., with a photodetector UVD-S365), a wavelength distribution with the wavelength 365 nm as the absolute value calibration wavelength, and, for example, a value obtained by detecting the light intensity in a sensitivity wavelength region range of 310 nm to 390 nm.

The gas-introduction pipe 5 is a pipe for introducing gas outside the pressurizable container 2 into the pressurizable container 2 and a member for changing the atmosphere and increasing the pressure inside the pressurizable container 2. Gas introduced through the gas-introduction pipe 5 into the pressurizable container 2 is introduced inside the pressurizable container 2 with at least a pressure higher than or equal to the pressure set by the pressure adjuster 8. Gas introduced through the gas-introduction pipe 5 may be, for example, oxygen gas, nitrogen gas, or a mixed gas of oxygen gas and nitrogen gas. A mass flow controller (not illustrated) may be disposed to the gas-introduction pipe 5 for adjusting the flow rate of introduced gas. When two or more types of gases are introduced, a gas mixer (not illustrated) may be provided to perform, for example, switching or mixing of introduced gases.

The humidifier 6 is a device that is connected to the gas-introduction pipe 5, for example, and causes water in the humidifier 6 to bubble so that the gas introduced through the gas-introduction pipe 5 is humidified. The humidifier 6 sets the humidity in the pressurizable container 2 to within a prescribed range. Note that a hygrometer (not illustrated) may be disposed between the humidifier 6 and the pressurizable container 2 or in the pressurizable container 2 so that humidification by the humidifier 6 is controlled by the control unit 15 or the like based on humidity information from the hygrometer.

The gas discharge pipe 7 is a pipe for discharging the gas from the pressurizable container 2. The gas discharge pipe 7 is attached with the pressure adjuster 8, and the pressure in the pressurizable container 2 is maintained at a set pressure by the pressure adjuster 8. In response to the detection unit 14 or the like detecting that the pressure in the pressurizable container 2 reaches the set pressure or higher, the pressure adjuster 8 opens a valve in the pressure adjuster 8 by the control of the control unit 15 to adjust pressure to the set pressure.

The water spray pipe 9 is a member for spraying water to a sample S disposed in the pressurizable container 2. After using the water flow rate adjuster 10 to adjust the flow rate of water supplied from the outside of the pressurizable container 2, the water spray pipe 9 sprays the water to a sample S in the pressurizable container 2. The water flow rate adjuster 10 is a device that adjusts the amount of water sprayed from the water spray pipe 9 to a sample S and sets a water amount according to a necessary amount. A spray nozzle is attached to the tip of the water spray pipe 9 in the pressurizable container 2, and water can be sprayed (in spray form, mist form, or shower form) to the entirety of a sample S through this spray nozzle. Also, the force of water sprayed from this spray nozzle can be adjusted by the adjustment by the water flow rate adjuster 10. A sprayer constituted by the water spray pipe 9 and the water flow rate adjuster 10 is a device that simulates rain under a real environment. Water to be sprayed may be pure water, tap water, water adjusted to a pH simulating acid rain, water containing metal ions, mixed water thereof, hydrogen peroxide solution, or the like.

The water discharge pipe 11 is a member for discharging water sprayed from the water spray pipe 9 in the pressurizable container 2 to the outside of the pressurizable container 2. The water discharge pipe 11 is attached with the water discharge valve 12; and unnecessary water will be discharged by operating the water discharge valve. The water discharge valve 12 is usually in a closed state during weather resistance testing and controlled to maintain the pressure and atmosphere (such as oxygen gas concentration) in the pressurizable container 2. When a prescribed condition using a water level sensor (not illustrated), time, or the like is satisfied, the water discharge valve 12 is opened by the control of the control unit 15, which allows unnecessary water or the like in the pressurizable container 2 to be externally discharged from the container. When the condition using the water level sensor is resolved, or a prescribed time has passed, the water discharge valve 12 is closed again by the control of the control unit 15.

The detection unit 14 is a sensor that detects various states in the pressurizable container 2. For example, the detection unit 14 detects any one of humidity, temperature (inner temperature or sample temperature), pressure, gas concentration, gas flow rate, the above-mentioned water level, and others. The detection unit 14 outputs the detected information (detected value) to the control unit 15.

The control unit 15 is a device that controls the overall operation of the weather resistance testing apparatus 1 and is constituted by, for example, a computer provided with a CPU and others. The control unit 15 is electrically connected, via wiring or the like, to the mass flow controller of the gas-introduction pipe 5, the humidifier 6, the pressure adjuster 8, the water flow rate adjuster 10, the water discharge valve 12, the temperature adjuster 13, and the detection unit 14. The control unit 15 controls operations of the mass flow controller of the gas-introduction pipe 5, the humidifier 6, the pressure adjuster 8, the water flow rate adjuster 10, the water discharge valve 12, and the temperature adjuster 13, based on the flow rate of introduced gas, the gas pressure, temperature, humidity, water level, and others in the pressurizable container 2 which are detected from the detection unit 14 and the like. Under the control of the control unit 15, a sample S disposed in the weather resistance testing apparatus 1 is disposed under a prescribed environment. The control unit 15 is also electrically connected to the light irradiation device 4 disposed outside the pressurizable container 2 via wiring or the like and controls the intensity, irradiation time and interval, and others of light L to be irradiated.

Specifically, in the control exerted by the control unit 15, the mass flow controller of the gas-introduction pipe 5 and the pressure adjuster 8, for example, are controlled to adjust the concentration of gas introduced through the gas-introduction pipe 5 and the pressure in the pressurizable container 2. For example, gas introduced through the gas-introduction pipe 5 may be pressurized so that the oxygen partial pressure contained in the gas is greater than the oxygen partial pressure in air. Also, the control unit 15 may control the mass flow controller to mix oxygen gas and nitrogen gas (inert gas) introduced through the gas-introduction pipe 5 so that the gasses have desired concentrations. Furthermore, after oxygen gas and nitrogen gas (inert gas) introduced through the gas-introduction pipe 5 are mixed to desired concentrations, the control unit 15 may pressurize the mixed gas introduced into the pressurizable container 2 using a compressor or the like. It is noted that in the weather resistance testing using the weather resistance testing apparatus 1, the concentration of introduced oxygen gas is preferably higher than the oxygen concentration in air and, for example, may be 20% to 100% in volume ratio relative to the entire gas in the pressurizable container 2.

Also, in the control exerted by the control unit 15, the gas pressure in the pressurizable container 2 is preferably adjusted by the pressure adjuster 8 to 1 MPa or less in gauge pressure. At this time, the oxygen concentration of gas introduced under pressurization is preferably 1% to 100% as the oxygen concentration before pressurization. It is further preferably 0.5 MPa or less in gauge pressure. This oxygen concentration of gas introduced under pressurization is preferably 4% to 100% as the oxygen concentration before pressurization. Such suppression of the gas pressure can decrease the container thickness of the pressurizable container 2, with the result that the pressurizable container 2 and the weather resistance testing apparatus 1 are reduced in size and weight.

Also, the control unit 15 may control the humidifier 6 to reproduce the weather resistance to humidity as under a real environment. The adjustment of humidity by the control unit 15 is performed by humidifying introduced gas using the humidifier 6 based on the information of humidity detected by the detection unit 14. Humidification in the weather resistance testing apparatus 1 is sufficient if a certain amount of humidification takes place, but it is preferable that the humidity in the pressurizable container 2 be between 40% and 100%, and more preferable that the humidity be between 50% and 100%. The control unit 15 controls the humidifier 6 to achieve such a humidity range. It is noted that in performing accelerated weather resistance testing, the oxygen concentration in the pressurizable container 2 is preferably selected depending on the intensity of the irradiation ultraviolet radiation from the light source 4*a* of the weather resistance testing apparatus 1, with respect to the oxygen amount necessary for a sample to be deteriorated by the ultraviolet radiation amount contained in sunlight under a real environment. Furthermore, for promoting the diffusion of oxygen to the inside of a sample S, the pressure in the pressurizable container can be increased to accelerate the deterioration of a sample S.

Here, a weather resistance testing method using the weather resistance testing apparatus 1 having the above-described configuration will be described. In the weather resistance testing method, a sample S used in weather resistance testing is firstly prepared. The number of samples S may be one or two or more. Also, the sample S is not limited to the later-described decorative sheet, may be members composed of various inorganic materials or organic materials, and is not particularly limited. Once such a sample S is prepared, the lid 2*b* of the pressurizable container 2 is removed, and the sample S is held on the sample holder 3, for example, by adhering the sample S thereto. Thereafter, the lid 2*b* is attached to the housing member 2*a* in an airtight manner and fixed by bolts or the like. Accordingly, the pressurizable container 2 in which the sample S is housed becomes a closed state.

Subsequently, the control unit 15 exerts control to set the pressure using the pressure adjuster 8 and introduce a prescribed flow rate of gas (oxygen gas and/or nitrogen gas) from the gas-introduction pipe 5 into the pressurizable container 2. The concentration and pressure (partial pressure) of the introduced gas are controlled to become prescribed values. Also, the control unit 15 controls the water flow rate adjuster 10 such that water in an adjusted water amount is supplied from the nozzle of the water spray pipe 9 to the sample S continuously or in a prescribed cycle. Furthermore, the control unit 15 controls the temperature adjuster 13 to adjust the temperature so that the sample S is kept at a prescribed temperature (for example, 80° C.). In the weather resistance testing apparatus 1 in this state, the inside of the pressurizable container 2 is irradiated with prescribed light L from the light irradiation device 4 through the quartz glass plate 16, and the sample S is irradiated.

Subsequently, the state of continuing such irradiation with light, pressurization, temperature adjustment, and supply of water is continuously performed, and the deterioration state of the sample S is tested. Such a test may be performed, for example, continuously for three months to six months or may be continued for six months or more or one year or more. Also, in the state of performing prescribed pressurization and temperature adjustment, irradiation with light, spraying of water, and others may be repeated in a prescribed cycle. Such a test state can be appropriately selected so as to be similar to a test under a real environment.

It is noted that the deterioration of a sample under a real environment includes not only the deterioration caused by light but also the deterioration of a sample by moisture (humidity) contained in rain and the air. Water adhering on the surface of a sample because of rain, humidity, and other factors diffuses from the surface of the sample to the inside of the sample, which causes the sample to be deteriorated through hydrolysis or the like. Therefore, the weather resistance testing apparatus 1 is configured such that, similarly to the relationship between the light intensity of the light source and oxygen, the amount of water spray and the humidity in the pressurizable container 2 can also be selected for promoting the deterioration by water. Furthermore, the pressurization of the inside of the pressurizable container 2 promotes diffusion of water into the sample. Also, the temperature of a sample S can be changed for further promoting the reaction between a sample deteriorated by light irradiation and oxygen and the hydrolysis reaction by water. The temperature of this sample may be adjusted based on the intensity of the light from the light irradiation device 4. In the weather resistance testing apparatus 1, these light intensity, oxygen concentration, pressure, water, humidity, and temperature are appropriately selected so that deterioration by light and deterioration by water proceed in a balanced manner. Weather resistance test results similar to results of testing performed under a real environment over a long period can be obtained in a short period without the negative effect of, for example, strongly suffering from only the influence by light.

As described above, the weather resistance testing apparatus 1 is configured such that the light irradiation device 4 having the light source 4*a* is disposed outside the pressurizable container 2 and irradiates the sample S in the pressurizable container 2 with light L from the outside of the pressurizable container 2. In this case, since the light irradiation device 4 is located outside the pressurizable container 2, the light irradiation device 4 is never damaged by a high pressure atmosphere or the like. Further, even if the light irradiation device 4 is damaged for some reason, the pressure in the pressurizable container 2 is not rapidly increased, and the effect on the pressurizable container 2 is reduced. Thus, according to this weather resistance testing apparatus 1, the use of the pressurizable container 2 can improve safety while accelerating weather resistance testing.

In addition, since the light irradiation device 4 is disposed outside the pressurizable container 2 according to the weather resistance testing apparatus 1, there is no need to unnecessarily increase the size of the pressurizable container 2 which requires a higher safety standard, and an apparatus including a smaller pressurizable container 2 can be achieved. Safety can be improved in this respect also. Furthermore, the disposition of the light irradiation device 4 outside the pressurizable container 2 facilitates the optical design in the light irradiation device 4, such as increasing the intensity of irradiation light L, facilitating selection of the wavelength of irradiation light L, or reducing illuminance unevenness of irradiation light to the sample S. Therefore, testing can be performed under an environment closer to that of a real environment (especially in optical terms) or can be promoted while maintaining a state close to that under a real environment. Thus, weather resistance testing can be accelerated while reproducing test results as under a real environment.

Also, in the weather resistance testing apparatus 1 according to the present embodiment, the light source 4*a* is preferably a xenon lamp having a light intensity of 15 $mW/cm^2$ or more and 60 $mW/cm^2$ or less. In this case, the sample S can be irradiated with light L having a high intensity, and thus weather resistance testing can be easily promoted. Also, since the waveform of the wavelength of irradiation light from a xenon (Xe) lamp is close to the waveform of sunlight, results of testing close to testing under a real environment can be easily obtained. That is, the use of the above-described light source makes it possible to rapidly obtain test results which reproduce results of weather resistance testing as under a real environment.

Also, in the weather resistance testing apparatus 1 according to the present embodiment, light L from the light source 4*a* preferably contains at least ultraviolet radiation. In this case, the irradiation light contains ultraviolet radiation which is contained in sunlight and which easily affects deterioration of materials or the like, and test results which reproduce results of testing as under a real environment can be easily obtained.

Also, in the weather resistance testing apparatus 1 according to the present embodiment, the light irradiation device 4 may further have an optical filter 4*b* that removes at least one of ultraviolet radiation having a wavelength of 290 nm or less and infrared radiation from light from the light source 4*a*. Since ultraviolet radiation having a wavelength of 290 nm or less is present only in extremely small amounts in ultraviolet radiation contained in sunlight, the use of the optical filter 4*b* to remove ultraviolet radiation having wavelengths of 290 nm or less makes it possible to easily obtain test results which reproduce results of testing as under a real environment. Also, when the light irradiated to a sample contains infrared radiation, the sample becomes heated by infrared radiation. However, for example, when an easily controllable separate temperature adjuster 13 is provided, the use of the optical filter to remove infrared radiation allows for a test in which the effect of infrared radiation is reduced, and weather resistance testing can be performed under more desirable test conditions.

Also, the weather resistance testing apparatus 1 according to the present embodiment further includes a gas-introduction pipe 5 that introduces a gas containing oxygen gas into the pressurizable container 2, a pressure adjuster 8 that adjusts a gas pressure in the pressurizable container 2, a humidifier 6 that humidifies the gas containing the oxygen gas, a water spray pipe 9 that sprays liquid to a sample S in the pressurizable container 2, a temperature adjuster 13 that adjusts the temperature of a sample S, a detection unit 14 that detects at least one of the introduced amount of the gas containing the oxygen gas, the gas pressure, the humidity of the gas containing the oxygen gas, and the temperature of a sample, and a control unit 15 that controls the gas-introduction pipe 5, the pressure adjuster 8, the humidifier 6, the water spray pipe 9, and the temperature adjuster 13 based on a value detected by the detection unit 14. In this case, weather resistance testing to evaluate the deterioration of a sample S caused by heat, water (rain), and oxygen can be more specifically performed, and the weather resistance testing can be accelerated by pressurization. That is, according to the above-described configuration, deterioration of a sample S caused by oxygen can be promoted, deterioration due to light irradiation and deterioration due to oxygen, water (rain), temperature, and other factors can proceed in a balanced manner, and test results similar to results of weather resistance testing performed under a real environment over a long time can be reproduced in a shorter time.

Also, in the weather resistance testing apparatus 1 according to the present embodiment, the control unit 15 may control the mass flow controller of the gas-introduction pipe 5 such that the concentration of oxygen gas introduced from the gas-introduction pipe 5 relative to the entire gas is 20% or more. In this case, results of weather resistance testing under an environment closer to a real environment can be obtained.

Also, in the weather resistance testing apparatus 1 according to the present embodiment, the control unit 15 may control the mass flow controller of the gas-introduction pipe 5 and the pressure adjuster 8 such that the oxygen partial pressure of oxygen gas introduced from the gas-introduction pipe 5 is 0.2 MPa or more and 0.9 MPa or less. In this case, the deterioration due to oxygen can be further promoted to further accelerate weather resistance testing under an environment close to a real environment. The "oxygen partial pressure" used herein is the value of the oxygen partial pressure in the apparatus when the atmospheric pressure is 0 MPa.

Second Embodiment

Figure 2:
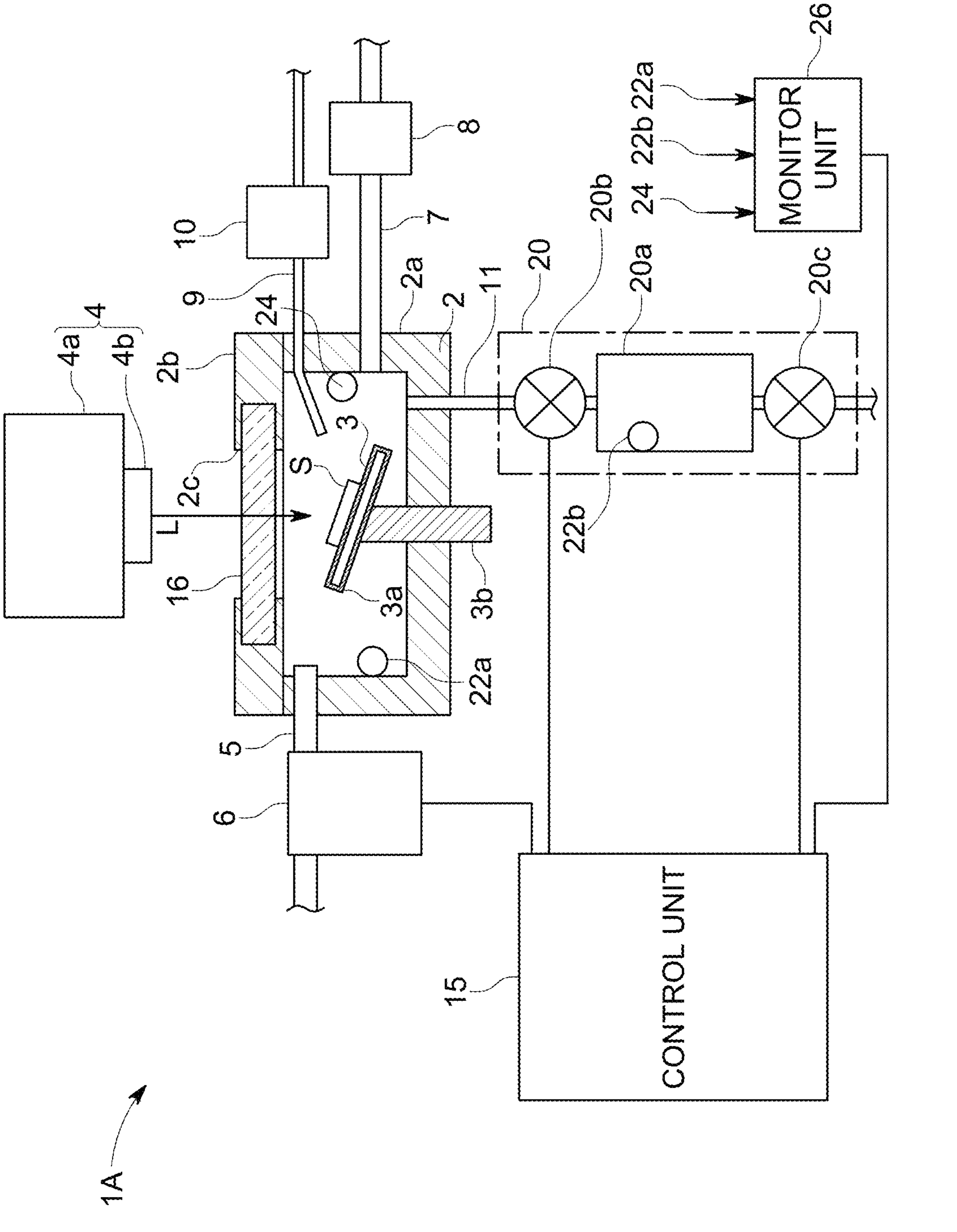
FIG. 2 is a cross-sectional view schematically illustrating a configuration of a weather resistance testing apparatus according to a second embodiment of the present invention.

Next, a weather resistance testing apparatus according to a second embodiment of the present invention will be described with reference to FIG. 2. As illustrated in FIG. 2, a weather resistance testing apparatus 1A according to the second embodiment includes, as in the first embodiment, a pressurizable container 2, a sample holder 3, a light irradiation device 4, a gas-introduction pipe 5, a humidifier 6, a gas discharge pipe 7, a pressure adjuster 8, a water spray pipe 9, a water flow rate adjuster 10, a water discharge pipe 11, a temperature adjuster, and a control unit 15. The weather resistance testing apparatus 1A further includes a water discharge mechanism 20, liquid level sensors 22*a* and 22*b*, a hygrometer 24, and a monitor unit 26.

The water discharge mechanism 20 is attached to the water discharge pipe 11 and performs a prescribed operation to discharge unnecessary water. The water discharge mechanism 20 includes a discharged water tank 20*a* (discharged liquid-storing unit) connected to the water discharge pipe 11, an openable and closable inlet valve 20*b* disposed to a part of the water discharge pipe 11 on the inflow side of the discharged water tank 20*a*, and an openable and closable discharge valve 20*c* disposed to a part of the water discharge pipe 11 on the outflow side of the discharged water tank 20*a*. The inlet valve 20*b* and the discharge valve 20*c* are usually in a closed state during weather resistance testing and controlled to maintain the pressure and atmosphere (such as oxygen gas concentration) in the pressurizable container 2.

The volume of the discharged water tank 20*a* is set to be not higher than the volume of the pressurizable container 2. Specifically, the volume of the discharged water tank 20*a* is preferably set to $1/6$ or less of the volume of the pressurizable container 2. It is more preferably $1/6$ or less and $1/60$ or more. Note that when a plurality of discharged water tanks 20*a* are provided, the total volume of the plurality of discharged water tanks 20*a* which can be simultaneously released is preferably set to not more than the volume of the pressurizable container 2.

The inlet valve 20*b* and the discharge valve 20*c* are controlled by the control unit 15. For example, the inlet valve 20*b* is controlled into an open state in response to water spray (supply of liquid) by the water spray pipe 9 ending. At the same time, the discharge valve 20*c* is controlled into a closed state. Then, the inlet valve 20*b* is controlled by the control unit 15 into a closed state in response to all water in the pressurizable container 2 being transferred to the discharged water tank 20*a*. On the other hand, after water in the pressurizable container 2 has been transferred to the discharged water tank 20*a*, and the inflow valve 20*b* has been controlled into a closed state, the discharge valve 20*c* is controlled from a closed state to an open state by the control unit 15 to discharge water stored in the discharged water tank 20*a*.

The pressurizable container 2 and the discharged water tank 20*a* are provided with, as a liquid level sensor to detect the water level in a container (tank), a liquid level sensor 22*a* that detects the water level of the pressurizable container 2 and a liquid level sensor 22*b* that detects the water level of the discharged water tank 20*a*, respectively. The information detected by the liquid level sensors 22*a* and 22*b* is input to the control unit 15 via the monitor unit 26.

The monitor unit 26 receives the measurement signals from the liquid level sensors 22*a* and 22*b* and a hygrometer 24, and displays these measurement signals on an unillustrated display device while transmitting the measurement signals to the control unit 15. A user of the weather resistance testing apparatus 1A can refer to the display of the monitor unit 26 to monitor the liquid levels in the pressurizable container 2 and the discharged water tank 20*a* and the humidity in the pressurizable container 2.

The control unit 15 further performs, in addition to the control in the first embodiment, the following control. Specifically, the control unit 15 controls the water flow rate adjuster 10 to spray water to a sample S through the water spray pipe 9 and then stop the operation of the water flow rate adjuster 10 and thereafter controls the inlet valve 20*b* into an open state. Accordingly, all water in the pressurizable container 2 is transferred to the discharged water tank 20*a*. Thereafter, the control unit 15 controls the inlet valve 20*b* into a closed state. In response to the inlet valve 20*b* switching into a closed state, the control unit 15 subsequently exerts control such that the discharge valve 20*c* switches from a closed state to an open state. Accordingly, all water stored in the discharged water tank 20*a* is discharged. Thereafter, the control unit 15 controls the discharge valve 20*c* into a closed state.

The control unit 15 may detect that all water in the pressurizable container 2 has been transferred to the discharged water tank 20*a*, based on the detected value of the liquid level sensor 22*a* disposed in the pressurizable container 2. Also, the control unit 15 may detect that water in the discharged water tank 20*a* has been completely discharged, based on, for example, the detected value of the liquid level sensor 22*b* disposed in the discharged water tank 20*a*. Furthermore, when it is determined that the water level in the pressurizable container 2 or the water level in the discharged water tank 20*a* exceeds a specified value based on the detected value of the liquid level sensor 22*a* or 22*b*, the control unit 15 may determine that an abnormality has occurred and, as described above, control the inlet valve 20*b* or the discharge valve 20*c* to discharge water. Accordingly, water in the pressurizable container 2 or in the discharged water tank 20*a* can be discharged. Also, in this case, the control unit 15 may perform a process to deal with the occurrence of abnormalities, such as stopping the supply of water by a water spray pipe 9.

As described above, according to the weather resistance testing apparatus 1A of the second embodiment, the same functions and effects as in the first embodiment can be exerted. Also, the weather resistance testing apparatus 1A includes the gas-introduction pipe 5 that introduces gas into the pressurizable container 2, the pressure adjuster 8 that adjusts the gas pressure in the pressurizable container 2, the water spray pipe 9 that supplies liquid into the pressurizable container 2, the discharged water tank 20*a* configured to be connected to the pressurizable container 2, the openable and closable inlet valve 20*b* disposed between the pressurizable container 2 and the discharged water tank 20*a*, and the openable and closable discharge valve 20*c* that discharges the liquid from the discharged water tank 20*a*. According to this configuration, the control of the open and close operation of the inlet valve 20*b* and the discharge valve 20*c* allows for externally discharging unnecessary liquid of the liquid supplied to the pressurizable container 2 while suppressing pressure change in the pressurizable container 2, when weather resistance testing is performed with the inside of the pressurizable container 2 pressurized.

Also, in the weather resistance testing apparatus 1A, the total volume of one or two or more of the discharged water tanks 20*a* is preferably not more than the volume of the pressurizable container 2. Accordingly, pressure change in the pressurizable container 2 during the discharge of liquid can be more reliably suppressed.

Third Embodiment

Figure 3:
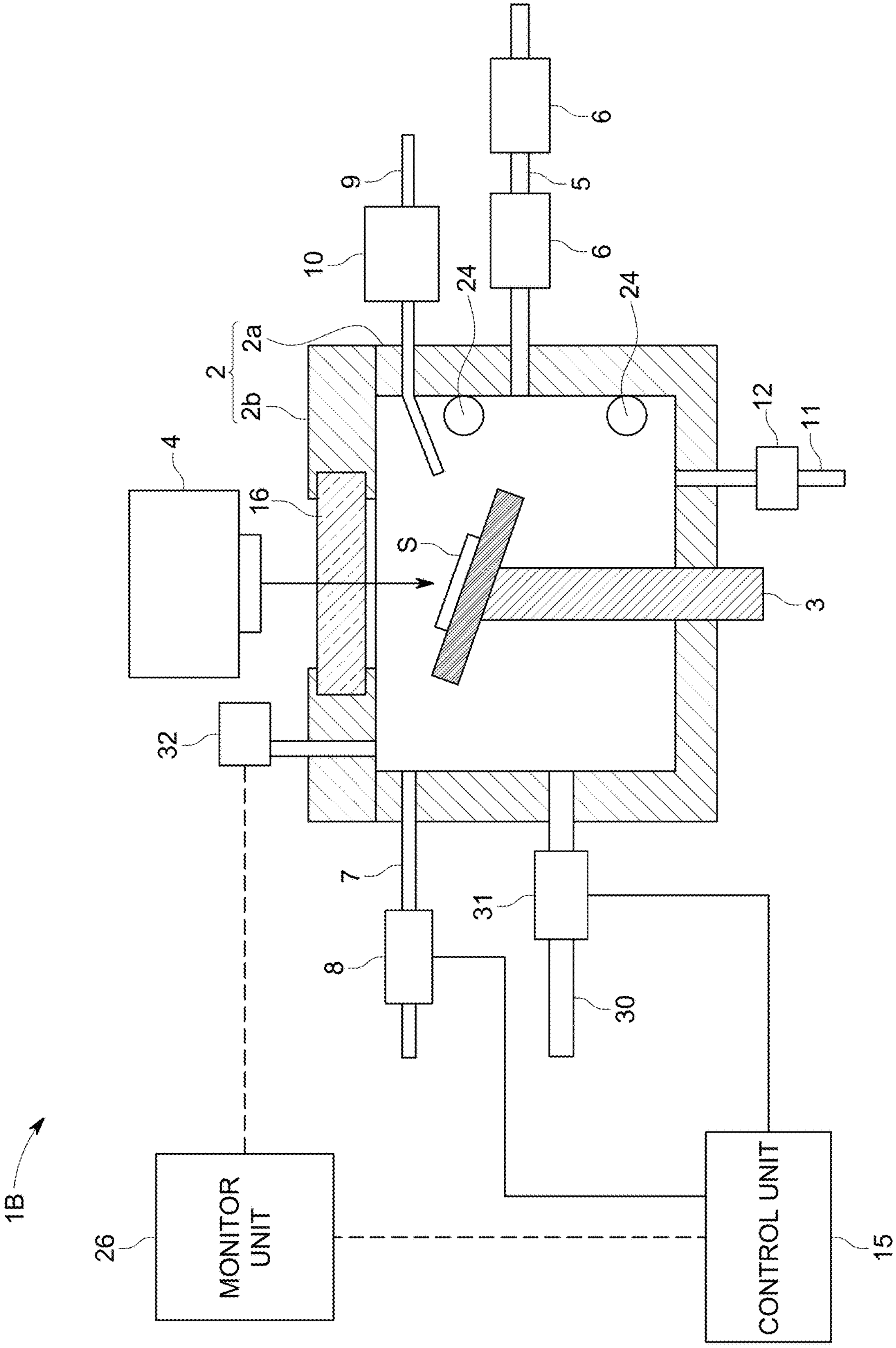
FIG. 3 is a cross-sectional view schematically illustrating a configuration of a weather resistance testing apparatus according to a third embodiment of the present invention.

Next, a weather resistance testing apparatus according to a third embodiment of the present invention will be described with reference to FIG. 3. As illustrated in FIG. 3, a weather resistance testing apparatus 1B according to the third embodiment includes, as in the first embodiment, a pressurizable container 2, a sample holder 3, a light irradiation device 4, a gas-introduction pipe 5, a humidifier 6, a gas discharge pipe 7, a pressure adjuster 8, a water spray pipe 9, a water flow rate adjuster 10, a water discharge pipe 11, a water discharge valve 12, a temperature adjuster, and a control unit 15. The weather resistance testing apparatus 1B further includes a monitor unit 26, a gas release pipe 30, a pressure release valve 31, and a pressure sensor 32. The basic function of the monitor unit 26 is the same as in the second embodiment.

The pressure release valve 31 attached to the gas release pipe 30 promotes the discharge of gas, when the pressure in the pressurizable container 2 increases and is not reduced to a set pressure value even by the discharge of gas through the gas discharge pipe 7. The control unit 15 acquires the detected value (pressure value) of the pressure sensor 32 attached to the pressurizable container 2 via the monitor unit 26 and controls the pressure release valve 31 into an open state in response to the acquired pressure value exceeding a prescribed threshold value. Such control lowers the pressure in the pressurizable container 2 when the gas pressure in the pressurizable container rapidly increases. The control unit 15 transmits a control signal corresponding to the acquired pressure value to the pressure release valve 31, and the pressure release valve 31 opens to a required opening degree based on the acquired control signal (that is, based on the detected pressure value). When the acquired pressure value exceeds a prescribed threshold value, the control unit 15 may control the pressure release valve 31 into a fully open position.

The pressure release valve 31 may be a member that deforms depending on the gas pressure in the pressurizable container 2. For example, the pressure release valve 31 may be a mechanical valve attached with an elastic member, such as a spring. With such a valve, the opening of such a valve can be automatically performed by the simplified configuration without using the control signal from the control unit 15, when the gas pressure in the pressurizable container 2 increases. Also, with such a valve, the valve can be operated (released) corresponding to an increase in gas pressure in the pressurizable container 2, even if the pressure sensor 32 fails.

The threshold value of the pressure for releasing the pressure release valve 31 may be a pressure value higher than the set pressure of the pressure adjuster 8. The pressure release valve 31 may be set to be operated (released) by control or mechanically in response to the gas pressure in the pressurizable container 2 becoming higher than this threshold value. Also, the threshold value of the pressure for releasing the pressure release valve 31 is preferably set lower than the withstand pressure of the pressurizable container 2. This prevents the pressurizable container 2 from being destroyed as a result of failing to withstand the pressure before the opening of the pressure release valve 31.

It is noted that when the pressure in the pressurizable container 2 does not decrease in spite of the pressure release valve 31 being opened for a prescribed time, the control unit 15 may determine that an apparatus abnormality is present and terminate gas introduction, humidity adjustment, water spraying, or the weather resistance testing itself.

As described above, according to the weather resistance testing apparatus 1B of the third embodiment, the same functions and effects as in the first embodiment can be exerted. Also, the weather resistance testing apparatus 1B further includes the gas-introduction pipe 5 that introduces gas into the pressurizable container 2, the pressure adjuster 8 that adjusts the gas pressure in the pressurizable container 2, and the pressure release valve 31 that releases the pressure in the pressurizable container 2. The pressure release valve 31 releases pressure in response to the gas pressure in the pressurizable container 2 exceeding the gas pressure adjustable by the pressure adjuster 8. Also, the maximum flow rate of gas released by the pressure release valve 31 may be larger than the maximum flow rate of gas flowing through the pressure adjuster 8. That is, the amount of gas released by the pressure release valve 31 is preferably larger than the amount of gas discharged through the pressure adjuster 8. According to this configuration, damage to the pressurizable container 2, failure of the measurement apparatus, or the like can be prevented by fully opening the pressure release valve 31 or opening the pressure release valve 31 according to the sub-pressure, even if excess pressure is applied to the pressurizable container 2 for some reason. This can further improve safety. The above-described third embodiment may be combined with the configuration of the second embodiment.

Fourth Embodiment

Figure 4:
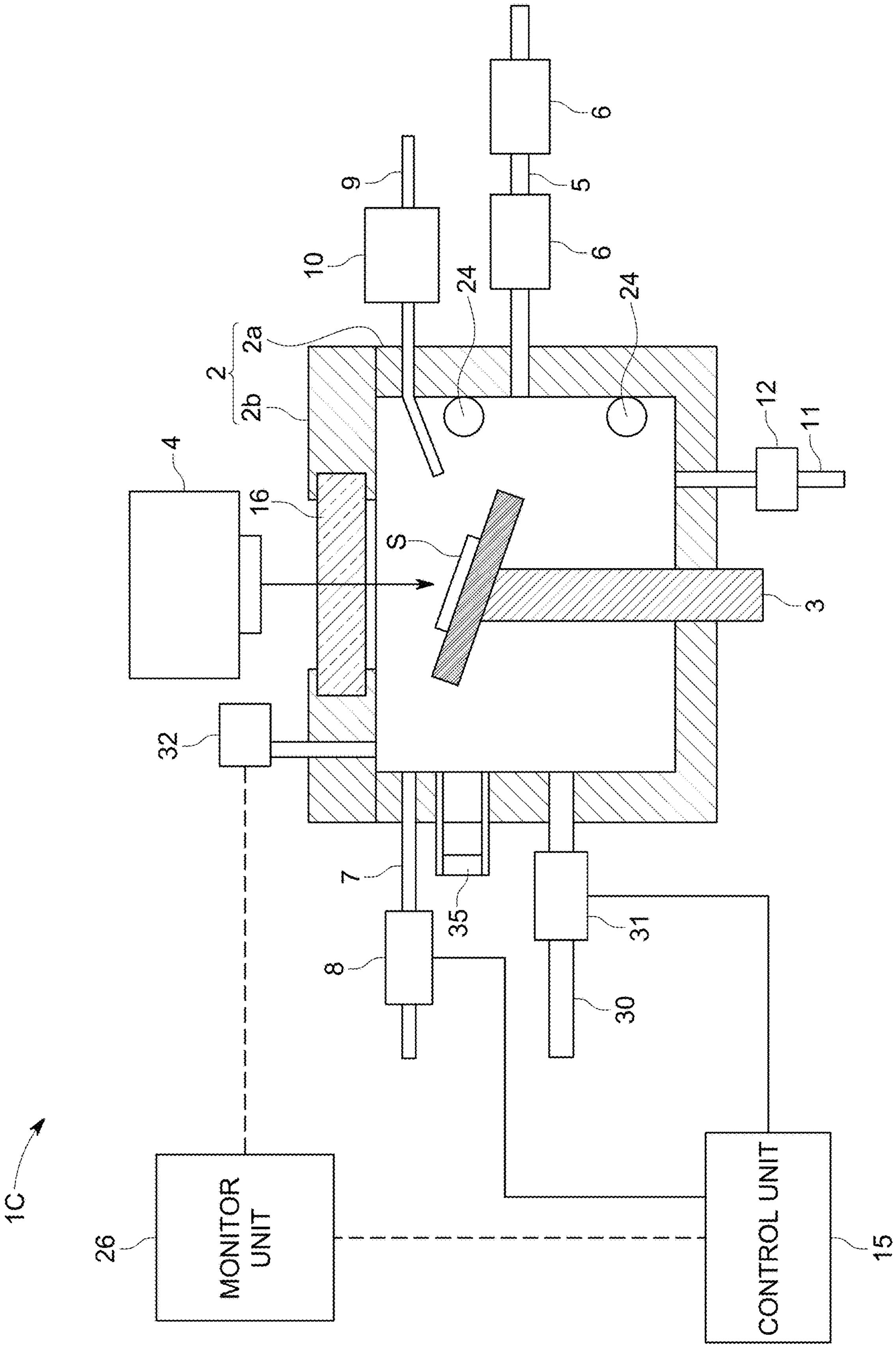
FIG. 4 is a cross-sectional view schematically illustrating a configuration of a weather resistance testing apparatus according to a fourth embodiment of the present invention.

Next, a weather resistance testing apparatus according to a fourth embodiment of the present invention will be described with reference to FIG. 4. As illustrated in FIG. 4, a weather resistance testing apparatus 1C according to the fourth embodiment includes, as in the third embodiment, a pressurizable container 2, a sample holder 3, a light irradiation device 4, a gas-introduction pipe 5, a humidifier 6, a gas discharge pipe 7, a pressure adjuster 8, a water spray pipe 9, a water flow rate adjuster 10, a water discharge pipe 11, a water discharge valve 12, a temperature adjuster, a control unit 15, a monitor unit 26, a gas release pipe 30, a pressure release valve 31, and a pressure sensor 32. The weather resistance testing apparatus 1C according to the fourth embodiment further includes a sealing valve 35.

The sealing valve 35 is an emergency release valve disposed on a part of the pressurizable container 2 and a valve that can rapidly release the gas in the pressurizable container 2 at a pressure lower than the withstand pressure of the pressurizable container 2. The withstand pressure of the sealing valve 35 is set higher than the withstand pressure of the pressure release valve 31 and lower than the withstand pressure of the pressurizable container 2. The materials of the sealing valve 35 are not limited as long as the previously described withstand pressure condition is satisfied. The sealing valve 35 can be made, for example, using a metal plate, a ceramics plate, a plastic plate, a glass plate, or a laminate thereof.

The sealing valve 35 is configured such that when the pressure increase in the pressurizable container 2 cannot be suppressed only by the release of a pressure by the pressure release valve 31, the sealing valve is broken before the pressurizable container 2 is destroyed. The provision of the sealing valve 35 can protect the pressurizable container 2 from destruction when the gas pressure in the pressurizable container 2 rapidly increases for some reason. It is noted that when the pressure release valve 31 is configured to be opened and closed based on a control signal (electrical signal) from the control unit 15, the disposition of such a sealing valve 35 can prevent the destruction of the container caused by the rapid increase of gas pressure in the pressurizable container 2 even if, for example, the control unit 15, the opening of the pressure release valve 31, or the pressure sensor 32 fails.

As described above, according to the weather resistance testing apparatus 1C of the fourth embodiment, the same functions and effects as in the first embodiment and the third embodiment can be exerted. Also, the weather resistance testing apparatus 1C further includes the sealing valve 35 that rapidly releases the pressure in the pressurizable container 2. The sealing valve 35 releases pressure when the gas pressure in the pressurizable container 2 is higher than the release pressure value of the pressure release valve 31. According to this configuration, pressure release is provided in two stages, which can more reliably prevent damage to the pressurizable container 2, failure of the measurement apparatus, or the like. The above-described fourth embodiment may be combined with the configuration of the second embodiment, in the same manner as the third embodiment.

Although the weather resistance testing apparatus according to the present embodiment has been described above, the weather resistance testing apparatus according to the present invention is not limited to the above-described embodiment, and various modifications can be adopted. For example, light L irradiated from the light irradiation device 4 to the sample S is preferably parallel light in the above-described embodiment, but more specifically, the weather resistance testing apparatus 1A can have the optical system having a configuration illustrated in FIG. 5. A weather resistance testing apparatus 1D includes a light irradiation device 4A, a pressurizable container 2, and the like, and the light irradiation device 4A is different from the above-described light irradiation device. Since other configurations are the same as the above-described weather resistance testing apparatus 1 according to the first embodiment, the description will be omitted. The light irradiation device 4A according to this modification includes a light source 40, a reflecting plate 41, a half mirror 42, a collimating lens 43, a reflecting mirror 44, and a lens 45.

In the light irradiation device 4A, light L1 emitted from the light source 40 (for example, a xenon lamp) travels to the half mirror 42 while being partly reflected at the reflecting plate 41. The half mirror 42 transmits and does not reflect light having unrequired wavelengths while reflecting light having certain wavelengths (for example, ultraviolet light) of the light L1, and light mainly including ultraviolet radiation propagates as light L2 toward the collimating lens 43. The collimating lens 43 converts incident light L2 into parallel light (collimated light) L3, which is reflected at the reflecting mirror 44 and propagates as parallel light into the pressurizable container 2 through the lens 45 to irradiate a sample S. In the light irradiation device 4A according to this modification, the light L3 irradiated to the sample S is parallel light, and therefore irradiation becomes more uniform without the sample being partly irradiated with strong light, so that weather resistance testing can be stably performed. In addition, when a plurality of samples S are simultaneously tested, illuminance unevenness of irradiation light to the samples S is eliminated because the irradiation light L3 is parallel light. This eliminates the need for work such as changing positions of the samples for smoothing illuminance unevenness during weather resistance testing (for example, for three months to six months). Accordingly, more accurate weather resistance test results can be obtained with less work. In the weather resistance testing apparatus 1D according to this modification, the light irradiation device 4A is disposed outside the pressurizable container 2, and the size of the optical system for generating parallel light is less restricted. Therefore, a more optimum optical system can be used. The configuration of the optical system that forms parallel light may be another configuration. Also, the light irradiation device 4A may include the above-described optical filter. The above-described light irradiation device 4A may be applied to any of the above-described embodiments.

EXAMPLES

Hereinafter, the present invention will be further specifically described by way of examples. However, the present invention is not limited to these examples.

(Test of Illuminance Unevenness)

Figure 6:
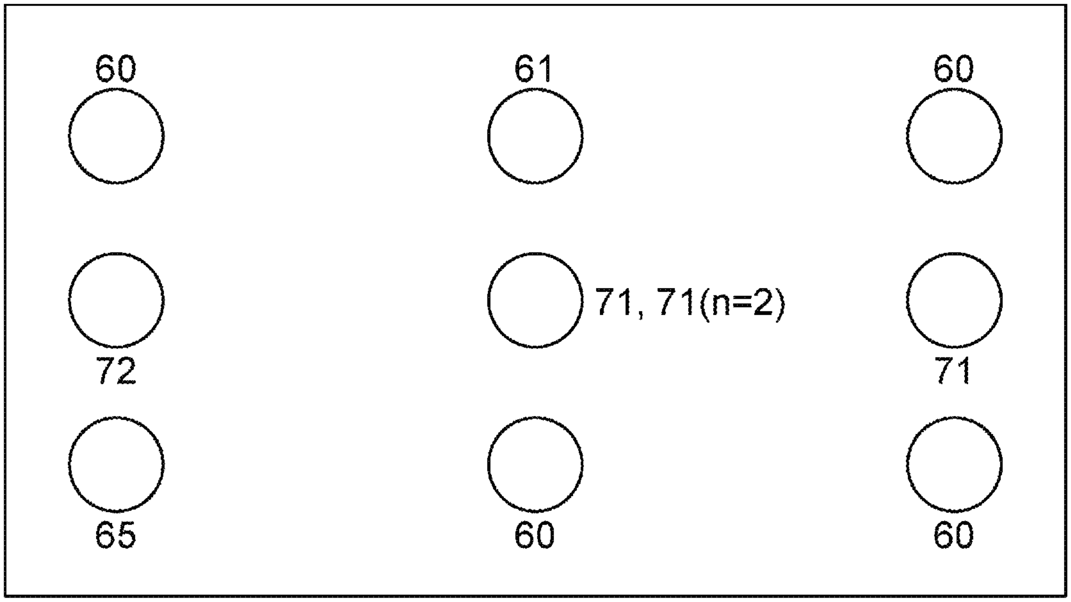
FIG. 6 is a diagram illustrating illuminance unevenness in Comparative Example 1.

First, using a known Metal Weather meter (manufactured by Daipla Wintes Co., Ltd., apparatus name: Daipla Metal Weather), the illuminance unevenness of irradiation light from a light source to a region (200 mm in width×400 mm in length) corresponding to a sample S was measured as illustrated in FIG. 6 (Comparative Example 1). As illustrated in FIG. 6, the above-described region was divided into nine locations, and the illuminance of each of the locations was measured. The result was that the average illuminance was 65.1 mW/cm$^2$, the maximum was 72 mW/cm$^2$, the minimum was 60 mW/cm$^2$, and the illuminance unevenness was 9.1%. The illuminance unevenness was calculated according to the following equation.

$$\text{Illuminance unevenness (\%)}=((\text{maximum value}-\text{minimum value})/(\text{maximum value}+\text{minimum value}))\times 100$$

Figure 5:
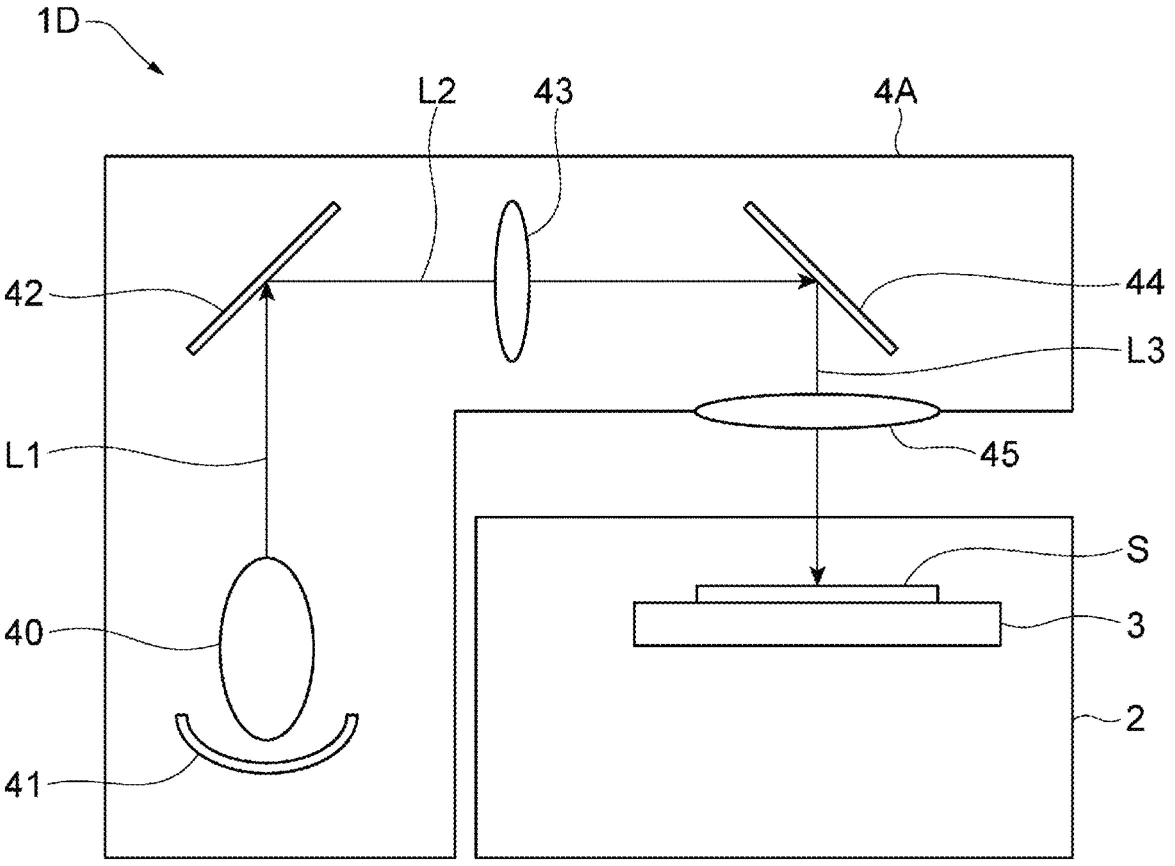
FIG. 5 is a diagram illustrating a modification of the weather resistance testing apparatus illustrated in FIG. 1.

Meanwhile, the weather resistance testing apparatus 1D having the optical system illustrated in FIG. 5 was prepared, and the illuminance unevenness in a region (72 mm in width×156 mm in length) corresponding to a sample S was measured (Example 1).

Figure 7A:
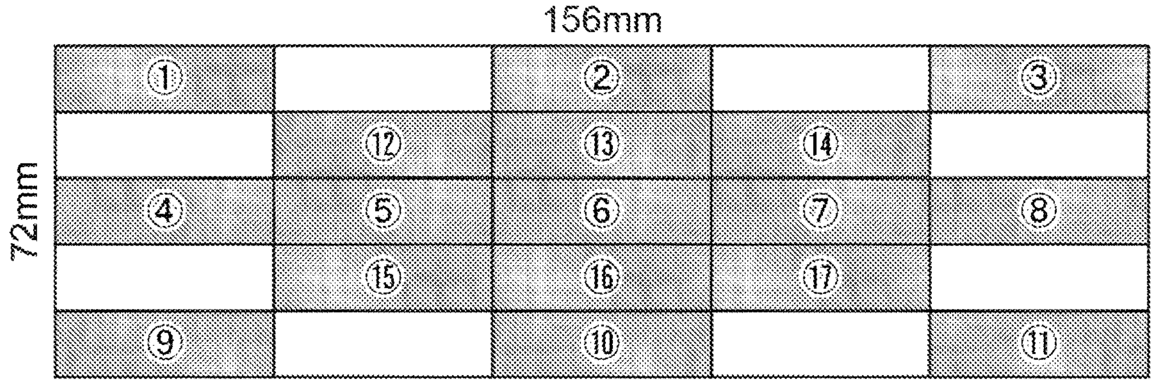
FIGS. 7A and 7B are a diagram illustrating illuminance unevenness in Example 1.
Figure 7B:
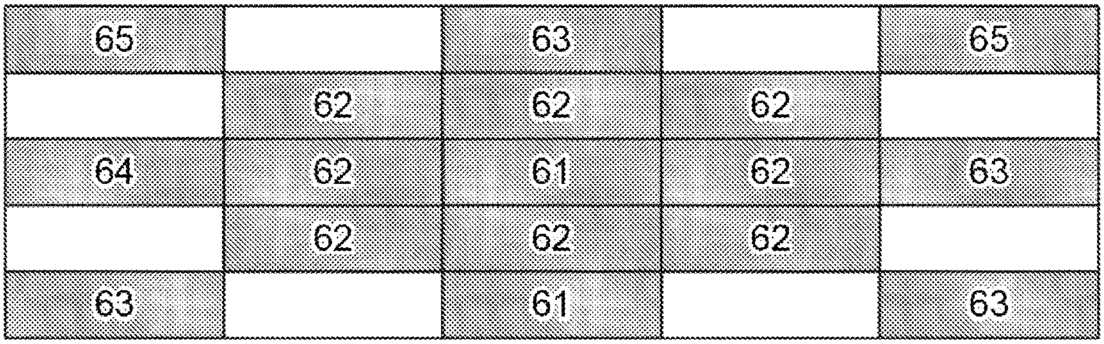

The above-described region was divided into 17 locations as illustrated in FIGS. 7A and 7B, and the illuminance of each of the locations was measured. Since the incident light was parallel light, the average illuminance was 62 mW/cm$^2$, the maximum was 65 mW/cm$^2$, the minimum was 61 mW/cm$^2$, and the illuminance unevenness was only about 3.4%. This demonstrated that when the irradiation light to a sample is parallel light in a weather resistance testing apparatus, the illuminance unevenness of irradiation light to the sample can be reduced.

(Test of Weather Resistance)

Figure 8:
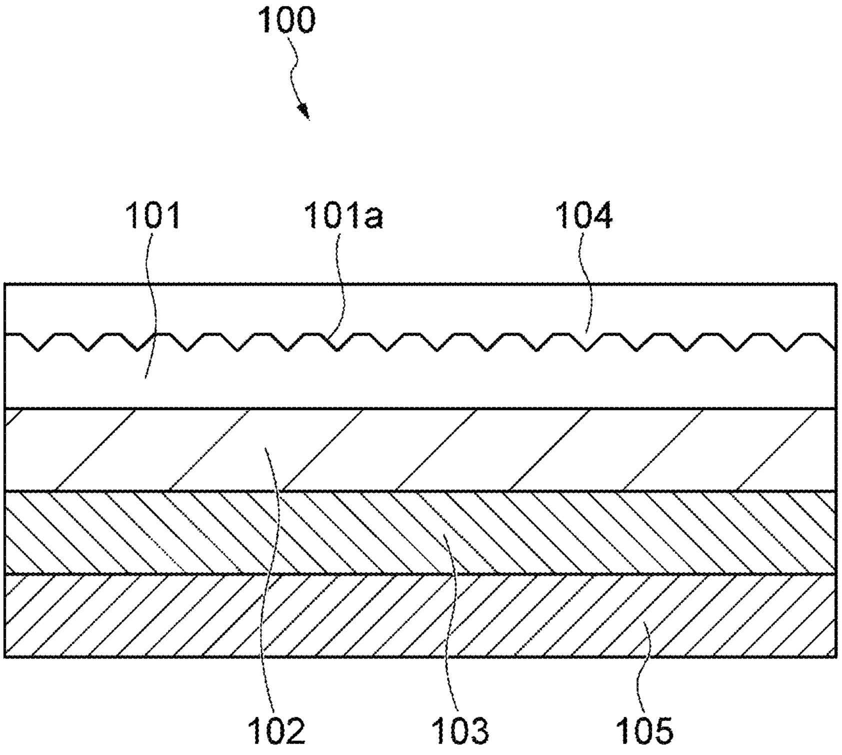
FIG. 8 is a cross-sectional view illustrating an example of a sample (decorative sheet) used in testing of Example 2 and others.

Next, using the weather resistance testing apparatus 1D illustrated in FIG. 5, real weather resistance testing of a decorative sheet was performed. The preparation method of a decorative sheet used in this weather resistance testing is as described below. FIG. 8 is a diagram illustrating a configuration of a decorative sheet 100. As comparative examples, weather resistance testing was performed using representative weather resistance testing apparatuses (an MW and a Xe apparatus) and under a real environment. The weather resistance test condition of each example was as illustrated in the table of FIG. 9. Details of the test result will be described later.

<Preparation of Transparent Resin Sheet>

A 100 μm thick transparent resin sheet made of highly crystalline polypropylene used as a transparent resin sheet 101 (resin layer) was film-formed by extruding, through a melt extruder, a resin obtained by adding, to a highly crystalline homopolypropylene resin, 500 PPM of a hindered phenol-based antioxidant (Irganox 1010: manufactured by Ciba Specialty Chemicals Inc.), 2000 PPM of a benzotriazole-based ultraviolet absorber (Tinuvin 328: manufactured by Ciba Specialty Chemicals Inc.), 2000 PPM of a hindered amine-based light stabilizer (Chimassorb 944: manufactured by Ciba Specialty Chemicals Inc.), and 1000 PPM of a phosphoric acid ester metal salt-based nucleating agent (ADK STAB NA-21: manufactured by ADEKA Corporation). Subsequently, both surfaces of the film-formed transparent resin sheet 101 were subjected to corona treatment so that the wettability of the surfaces was 40 dyn/cm or more. It is noted that the extrusion temperature and the cooling condition of a roll or the like during the extrusion for film formation were varied to prepare various types of transparent resin sheets.

<Preparation of Decorative Sheet>

One surface of each of the transparent resin sheets 101 obtained using the respective transparent resin sheets prepared was subjected to pattern printing with a two-part curing urethane ink (V180: manufactured by Toyo Ink Co., Ltd.) to form a pattern layer 102. Thereafter, over the pattern layer 102, a two-part curing urethane ink having concealing properties (V180: manufactured by Toyo Ink Co., Ltd.) was applied with an application amount of 6 g/M$^2$ to form a concealing layer 103. Also, over the concealing layer 103, a two-part curing urethane ink (PET-E, Reducer: manufactured by Dainichiseika Color & Chemicals Mfg. Co., Ltd.) was applied at an application amount of 1 g/m$^2$ to form a primer layer 105.

Next, the surface of each of these transparent resin sheets 101 facing away from the primer layer 105 was pressed using an embossing mold roll to form an embossed pattern 101*a*. Thereafter, on the surface of the embossed pattern 101*a*, a two-part curing urethane top coat (W184: manufactured by DIC Corporation) was applied at an application amount of 3 g/m$^2$ to obtain a decorative sheet 100 that contains a coating layer 104 and has a total thickness of 110 μm. Each decorative sheet 100 was bonded to a metal substrate using a urethane-based adhesive, and thereafter the weather resistance was evaluated using the various above-mentioned weather resistance testing apparatuses. The evaluation results were as illustrated in the table of FIG. 9.

Comparative Example 2

Also, as Comparative Example 2, a Metal Weather meter (manufactured by Daipla Wintes Co., Ltd., apparatus name: Daipla Metal Weather) was prepared. The light source of this MW was a metal halide lamp. The conditions of Comparative Example 2 were as below.

Optical filter: transmits wavelengths of 295 nm to 780 nm

Light intensity (illuminance): light intensity at a wavelength of 330 nm to 390 nm For setting the light intensity, the light intensity was set using an illuminometer having a center wavelength of 360 nm (manufactured by Ushio Inc.).

In Comparative Example 2, an operation of performing irradiation, water spraying, dew condensation, water spraying, and irradiation in this order was repeated as illustrated in Table 1 below.

TABLE 1

| | Light intensity (mW/cm$^2$) | BP temperature (° C.) | Humidity (% RH) | Time |
|---|---|---|---|---|
| Irradiation | 60 | 63 | 50 | 20 hr |
| Water spraying (rainfall) | — | | | 30 sec |
| Dew condensation | — | 30 | 98 | 4 hr |
| Water spraying (rainfall) | — | | | 30 sec |

Comparative Example 3

As Comparative Example 3, a xenon (Xe) apparatus (manufactured by Toyo Seiki Seisaku-sho, Ltd., apparatus name: ATLAS Ci4000) was prepared. The light source of this apparatus was a xenon lamp. The conditions of Comparative Example 3 were as below.

Optical filter: transmits wavelengths of 295 nm to 780 nm

Light intensity (illuminance): light intensity at a wavelength of 300 nm to 400 nm For setting the light intensity, the light intensity was set using an illuminometer having an absolute value calibration wavelength of 365 nm (UIT250 manufactured by Ushio Inc., with a photodetector UVD-5365).

In Comparative Example 3, an operation of performing irradiation, water spraying, dew condensation, water spraying, and irradiation in this order was repeated as illustrated in Table 2 below.

TABLE 2

| | Light intensity (mW/cm$^2$) | BP temperature (° C.) | Humidity (% RH) | Time |
|---|---|---|---|---|
| Irradiation | 6 | 63 | 50 | 20 hr |
| Water spraying (rainfall) | — | | | 30 sec |
| Dew condensation | — | 30 | 98 | 4 hr |
| Water spraying (rainfall) | — | | | 30 sec |

Comparative Example 4

As Comparative Example 4, a super xenon (S-Xe) apparatus (manufactured by Toyo Seiki Seisaku-sho, Ltd., apparatus name: ATLAS Ci4000) was prepared. The light source of this apparatus was a xenon lamp. The apparatus itself used in Comparative Example 4 was the same as the apparatus of Comparative Example 3, and the distance between the light source and the sample was decreased to 290 mm. It is noted that in the apparatus of Comparative Example 3, the distance between the light source and the sample was 324 mm, and in Comparative Example 4, the sample was more closely irradiated with light, that is, was irradiated with a larger intensity of light. The conditions of Comparative Example 4 were as below.

Optical filter: transmits wavelengths of 295 nm to 780 nm

Light intensity (illuminance): light intensity at a wavelength of 300 nm to 400 nm For setting the light intensity, the light intensity was set using an illuminometer having an absolute value calibration wavelength of 365 nm (UIT250 manufactured by Ushio Inc., with a photodetector UVD-S365).

In Comparative Example 4, an operation of performing irradiation, water spraying, dew condensation, water spraying, and irradiation in this order was repeated as illustrated in Table 3 below.

TABLE 3

| | Light intensity (mW/cm$^2$) | BP temperature (° C.) | Humidity (% RH) | Time |
|---|---|---|---|---|
| Irradiation | 18 | 63 | 50 | 20 hr |
| Water spraying (rainfall) | — | | | 30 sec |
| Dew condensation | — | 30 | 98 | 4 hr |
| Water spraying (rainfall) | — | | | 30 sec |

As Examples 2 to 7, the weather resistance testing apparatus 1D having the configuration illustrated in FIG. 5 was prepared. In this weather resistance testing apparatus 1D, the light source was a xenon lamp. The conditions of Examples 2 to 7 were as below. It is noted that in Examples 2 to 7, the same testing apparatus was used under varied test conditions.

Optical filter: transmits wavelengths of 290 nm to 490 nm

Light intensity (illuminance): light intensity at a wavelength of 330 nm to 390 nm For setting the light intensity, the light intensity was set using an illuminometer having an absolute value calibration wavelength of 365 nm (UIT250 manufactured by Ushio Inc., with a photodetector UVD-S365).

In Examples 2 to 7, an operation of performing irradiation, water spraying, dew condensation, water spraying, and irradiation in this order was repeated as illustrated in Table 4 below.

TABLE 4

| | Light intensity (mW/cm²) | Sample temperature (° C.) | Humidity (% RH) | Gas | Pressure | Time |
|---|---|---|---|---|---|---|
| Irradiation | 10 to 60 | 80 | 50 | Flowed | Pres-surized | 10 hr |
| Water spraying (rainfall) | — | | | Flowed | Pres-surized | 30 sec |
| Dew con-densation | — | 50 | 98 | Flowed | Pres-surized | 2 hr |
| Water spraying (rainfall) | — | | | Flowed | Pres-surized | 30 sec |

<Evaluation>

Samples after the weather resistance testing using the weather resistance testing apparatuses according to Comparative Examples 2 to 4 and Examples 2 to 7 were compared by observing appearance and evaluating a change in hardness of each layer. As Comparative Example 5, a weather resistance test result under a real environment (eight years) was added. For observing appearance, a microscope or a laser microscope was used to compare the observations of the presence or absence of cracking on the sample surface. Also, the presence or absence of peeling was checked by hand.

As illustrated in the table of FIG. 9, surface cracking and internal peeling occurred in the sample of Comparative Example 5 (standard example) subjected to the weather resistance testing under a real environment (eight years). On the other hand, in Comparative Examples 2 to 4, surface cracking occurred, but peeling of the layers of the decorative sheet as seen under a real environment did not occur. Also, the cracking was somewhat whitish, unlike the cracking under a real environment.

On the other hand, in Examples 2 to 7, it was confirmed that irradiation with xenon light, introduction of oxygen gas, an oxygen partial pressure of 0.2 MPa or more, heating to 80° C.), water spraying, a humidity of 50%, and other factors can cause surface cracking and peeling in the inner layers, as in the sample of Comparative Example 5 subjected to the weather resistance testing under a real environment (eight years), in a short time.

REFERENCE SIGNS LIST

1, 1A, 1, 1C, 1D . . . Weather resistance testing apparatus; 2 . . . Pressurizable container; 3 . . . Sample holder; 4, 4A . . . Light irradiation device; 4*a*, 40 . . . Light source; 4*b* . . . Optical filter; 5 . . . Gas-introduction pipe (gas-introduction unit); 6 . . . Humidifier; 7 . . . Gas discharge pipe; 8 . . . Pressure adjuster (pressure-adjustment unit); 9 . . . Water spray pipe (spray unit, liquid supply unit); 10 . . . Water flow rate adjuster; 13 . . . Temperature adjuster (temperature-adjustment unit); 14 . . . Detection unit; 15 . . . Control unit; 16 . . . Quartz glass plate (light-transmitting member); 20*a* . . . Discharged water tank (discharged liquid-storing unit); 20*b* . . . Inlet valve; 20*c* . . . Discharge valve; 31 . . . Pressure release valve; 35 . . . Sealing valve; 43 . . . Collimating lens; L, L3 . . . Light; S . . . Sample.

What is claimed is:

1. A weather resistance testing apparatus, comprising:

a pressurizable container having a light-transmitting member capable of transmitting light;

a sample holder that is disposed in the pressurizable container and is capable of holding a sample;

a light irradiation device comprising a light source, a gas-introduction unit configured to introduce a gas containing oxygen gas into the pressurizable container;

a pressure-adjustment unit configured to adjust a gas pressure in the pressurizable container;

a humidification unit configured to humidify the gas containing the oxygen gas;

a spray unit configured to spray liquid onto the sample in the pressurizable container;

a temperature-adjustment unit configured to adjust a temperature of the sample;

a detection unit configured to detect at least one of an introduced amount of the gas containing the oxygen gas, the gas pressure, a humidity of the gas containing the oxygen gas, and a temperature of the sample; and a control unit configured to control at least one of the gas-introduction unit, the pressure-adjustment unit, the humidification unit, the spray unit, and the temperature-adjustment unit based on a value detected by the detection unit, wherein the light irradiation device is disposed outside the pressurizable container and is configured to irradiate the sample with light from the light source via the light-transmitting member;

the light source is disposed outside the pressurizable container at a distance from the light-transmitting member;

the light from the light source passing the light-transmitting member is parallel light;

the light source disposed outside the pressurizable container at a distance from the light-transmitting member is the only light source in the apparatus; and the light source is a xenon lamp having a light intensity of 15 $mW/cm^2$ or more and 60 $mW/cm^2$ or less, and wherein the control unit is configured to control at least one of the gas-introduction unit and the pressure-adjustment unit such that an oxygen partial pressure of the oxygen gas introduced through the gas-introduction unit is 0.2 MPa or more and 0.9 MPa or less.

2. The weather resistance testing apparatus of claim 1, wherein the light irradiation device further comprises at least one collimating lens.

3. The weather resistance testing apparatus of claim 1, wherein the light from the light source contains at least ultraviolet radiation.

4. The weather resistance testing apparatus of claim 1, wherein the light irradiation device further includes an optical filter that removes, from the light from the light source, at least one of ultraviolet radiation having a wavelength of 290 nm or less and infrared radiation.

5. The weather resistance testing apparatus of claim 1, wherein the control unit is configured to control the gas-introduction unit such that a concentration of the oxygen gas introduced through the gas-introduction unit relative to an entirety of the gas containing the oxygen gas is 20% or more.

6. The weather resistance testing apparatus of claim 1, further comprising:

a liquid supply unit configured to supply liquid into the pressurizable container;

a discharged liquid-storing unit configured to be connected to the pressurizable container;

an openable and closable inlet valve disposed between the pressurizable container and the discharged-liquid storing unit; and an openable and closable discharge valve configured to discharge the liquid in the discharged liquid-storing unit.

7. The weather resistance testing apparatus of claim 6, wherein a total volume of the discharged liquid-storing unit is less than or equal to a volume of the pressurizable container.

8. The weather resistance testing apparatus of claim 1, further comprising:

a pressure release valve configured to release a pressure in the pressurizable container, wherein the pressure release valve is configured to release the pressure in the pressurizable container when the gas pressure in the pressurizable container exceeds a gas pressure adjustable by the pressure-adjustment unit, and a maximum flow rate of the gas released by the pressure release valve is greater than a maximum flow rate of the gas flowing through the pressure-adjustment unit.

9. The weather resistance testing apparatus of claim 8, further comprising a sealing valve that releases the pressure in the pressurizable container, wherein the sealing valve releases the pressure in the pressurizable container when a value of the gas pressure in the pressurizable container is greater than a release pressure value of the pressure release valve.

10. A weather resistance testing method of evaluating weather resistance of the sample using the weather resistance testing apparatus of claim 1, the method comprising:

a step of having the sample held on the sample holder; and a step of irradiating the sample with the light from the light irradiation device.

11. The weather resistance testing method of claim 10, wherein the light irradiated to the sample is parallel light that contains ultraviolet light.

* * * * *